Figure 1:
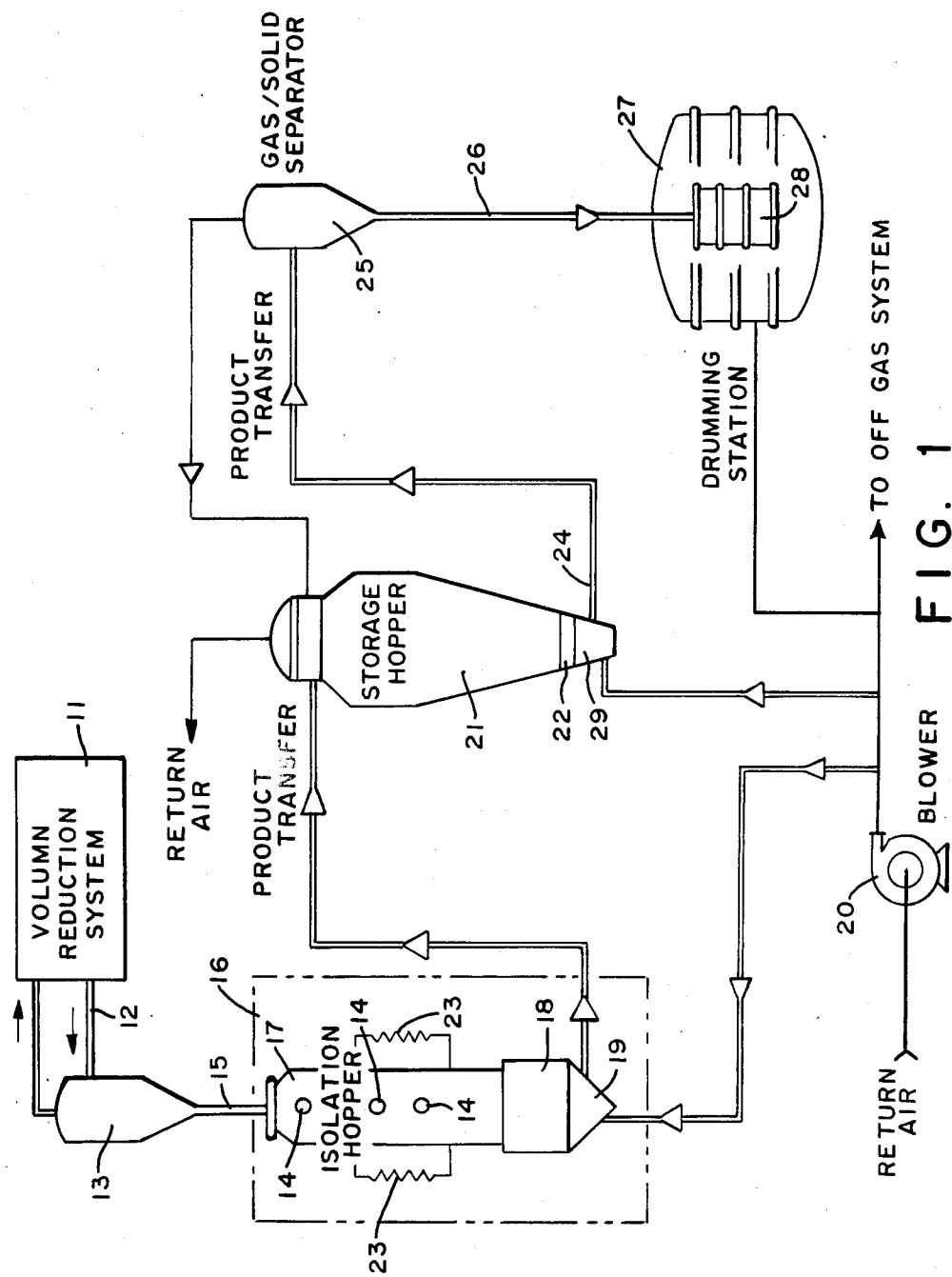

United States Patent [19]

Homer et al.

[11] Patent Number: 4,668,478
[45] Date of Patent: May 26, 1987

[54] VERTICALLY POSITIONED TRANSFER SYSTEM FOR CONTROLLING AND INITIATING THE FLOW OF METERED AMOUNTS OF SOLID MATERIALS

[75] Inventors: John C. Homer, Chardon; Gilbert F. Lutz, Chesterland, both of Ohio

[73] Assignee: General Signal Corporation, Stamford, Conn.

[21] Appl. No.: 627,130

[22] Filed: Jul. 2, 1984

[51] Int. Cl.⁴ .............................................. G01F 11/18
[52] U.S. Cl. .................................... 422/159; 212/345; 212/346; 212/366; 414/146; 414/199; 414/217; 414/221
[58] Field of Search ........................ 222/366, 345, 346; 422/159; 414/146, 199, 217, 221

[56] References Cited

U.S. PATENT DOCUMENTS

| | | |
|---|---|---|
| 853,769 | 5/1907 | Caviglia . |
| 1,020,758 | 3/1912 | Hillyard . |
| 1,157,860 | 10/1915 | Gage . |
| 1,520,017 | 12/1924 | Denton . |
| 1,574,813 | 3/1926 | Hafner . |
| 1,727,526 | 9/1929 | Thompson . |
| 2,311,330 | 2/1943 | Dudly ................................ 222/366 |
| 2,357,387 | 8/1944 | Dudly ................................ 222/366 |
| 2,363,155 | 11/1944 | Smith . |
| 2,702,133 | 2/1955 | Kilpatrick ........................... 414/199 |
| 2,783,097 | 2/1957 | Goins . |
| 2,792,155 | 5/1957 | Bellardi . |
| 2,840,278 | 6/1958 | Townhill . |
| 3,040,937 | 6/1962 | Cantery ............................... 222/366 |
| 3,813,127 | 5/1974 | DeFeudis . |
| 3,858,763 | 1/1975 | Mack . |
| 3,949,791 | 4/1976 | Vadas . |
| 4,023,713 | 5/1977 | Brotzmann et al. . |
| 4,127,151 | 11/1978 | Ueda et al. . |

*Primary Examiner*—Barry S. Richman
*Assistant Examiner*—Billy Ray Johnson
*Attorney, Agent, or Firm*—Jeffrey S. Mednick; Martin LuKacher

[57] ABSTRACT

A transfer system for controlling and initiating the flow of metered amounts of materials which may be radioactive ash, radioactive calcined salts, cement, flour, or pharmaceuticals comprising a vertical non-converging conduit which acts as a storage hopper; a stationary platform located at the downward end of the conduit to allow the radial outward flow of the material; a translatable hollow piston that acts externally but coaxially to the conduit and platform to interrupt the radial flow of material; a hopper located below the platform for accepting the material; and a housing that encloses and supports the hopper and platform and provides a dust tight seal around the apparatus of this invention.

17 Claims, 3 Drawing Figures

000# VERTICALLY POSITIONED TRANSFER SYSTEM FOR CONTROLLING AND INITIATING THE FLOW OF METERED AMOUNTS OF SOLID MATERIALS

FIELD OF THE INVENTION

This invention relates to transfer systems and more particularly to a device and method for transferring materials which may or may not be hazardous.

DESCRIPTION OF THE PRIOR ART

The operation of a nuclear power plant or the use of radioactive materials results in the formation of waste products. Some of these waste products are radioactive and they must be carefully disposed of so that they will not endanger the health and safety of the nuclear worker or the general public.

The primary objective of radioactive waste treatment is to collect the waste products and process them so that they may be safely contained and managed until the waste products are no longer radioactive. Most nuclear power plants during operation produce gaseous, liquid and solid radioactive waste products. Gaseous radioactive wastes are formed from the disassociation of the reactive coolant and the fission of uranium. Liquid radioactive waste products are produced from the reactive coolant. Solid radioactive waste products are formed as a consequence of the saturation of bead resins with radioactive impurities, used radioactive filters and evaporator concentrates. Other solid waste products are: contaminated rags; clothing; broken tools; etc..

Oftentimes radioactive waste products were incinerated to reduce their volume and make it easier and cheaper to encapsulate and bury the radioactive products until the material was no longer radioactive. The prior art utilized totally mechanical transfer systems to move the radioactive ash from the incinerator where the material was burned to the place where the material was encapsulated. One prior art system used to cool the radioactive material in a tube which was surrounded by a jacket of water and moved the radioactive ash via a rotary valve and screw or auger transferring system. Some of the disadvantages of the foregoing were: failure of the water jacket may allow water to solidify the ash or within the storage vessel, thus, paralyzing the salt transfer function; too rapid cooling of the salt may permit condensation of the large inner surfaces of the storage hopper causing a buildup of crust and eventual cessation of flow, and possible damage to the conveying equipment; in order to operate screw augers and rotary valves, a penetration and packing of the pressure boundary was required; the penetrations provided a means of escape for the radioactive powder to the environment, and augers and valves further added to the problem of transfer because they compacted the materials in confined or convergent areas. Repair on the packings and large internal components required removal of the radioactive materials, decontamination of the equipment, frequent unnecessary exposure of personnel to radiation, and introduced additional contaminated non-compatible materials to the plant's waste problem.

SUMMARY OF THE INVENTION

The invention overcomes the disadvantages of the prior art by providing a radioactive material transfer system that does not use water as a coolant; does not use active mechanical parts that dissipate large amounts of energy or require dynamic seals, packing or mechanical pressure boundary penetrations; does not compact or permit consolidation of powdered contents to the point where they can not be transferred. The apparatus of this invention stores the freshly incinerated or calcined particles (powders) in a straight walled cylindrical hopper of small cross section and volume, and maintains the material in constant motion until it is cooled sufficiently to be placed in static storage. In a typical application, the radioactive powder enters the system at 850° F. and at a pressure of 5 to 10 psig, and exits the system at 130° F. and −3 psig. Several passive sensors arranged in the hopper insure that the average rate of transfer from the lower portion of the system automatically matches the average transfer rate into the upper hopper.

Below the upper hopper a pneumatically operated hollow piston is caused to cycle an annular chamber up-and-down. The hollow piston is in alignment with a centrally located fixed cylindrical platform. When the chamber is positioned above the platform, the radioactive powders spill and/or are pushed into the chamber by the weight of the column of powder. The flow of the powder is divergent and its flow overcomes the tendency of the powder to consolidate in this area. When the piston is caused to move downward, the chamber moves below the stationary platform carrying a fixed volume of powder with it. The platform supports the column of powder in the hopper and the powder in the annular chamber is free to fall into a closed chamber located directly below the platform.

Cooling of the radioactive powder is accomplished by two methods. On the external surface of the hopper many vertical and radially oriented steel fins remove heat from the hopper wall by means of radiation and convection into the air surrounding the system. By maintaining the rate of feed into, and out of, the hopper, the temperature of the powder is reduced from 850° F. to less than 300° F. The foregoing method of heat transfer is limited by the vessel's height, the rate of material flow and the temperature differential, therefore further cooling is accomplished within the closed vessel located below the internal stationary platform of the transfer piston. Cool, dry, negative pressure air provided from a remote blower is recirculated through the cooling hopper and the small volume of powder previously transferred to it from the annular chamber. The heat removed at this time is transferred out of the system by an air to air heat exchanger located at the exhaust of the remote blower.

An air seal between the upper hopper and lower cooling hopper is accomplished by the column of powder resting above the stationary platform at the transfer piston and is further enhanced when the piston is in the down or discharge position by a circular flat surface machined on the inside piston wall that compresses a narrow circular area of powder at the periphery of the stationary platform. This action, working with the air seal provided by the column of powder, effectively seals the positive 5 to 10 psig pressure of the upper hopper from the negative 1 to 3 psig pressure of the lower cooling hopper.

At the completion of the cooling cycle of the cooling hopper, cooling air that had been exhausted through a nozzle designed to be inefficient in transferring powder is diverted through a nozzle efficient in powder transfer. The cooled, dry powder is pneumatically transferred by said cooling air to static storage thereby completing the transfer cycle of the high temperature powder across a pressure boundary to static storage.

The processing of the powder is complete only after it has been combined with a solidification agent. The solidification process requires that the powder be cool and free flowing. Solidification may be accomplished immediately after cooling, or at some later time as dictated by plant operating conditions and procedures. In the application described above, the powder is now cool enough for stabilization with a solidification agent and may be transferred out of static storage. This is accomplished at the bottom of the static storage hopper by numerous independent vibrators that feed the powder into a negative pressure air stream that carries the powder to a passive device such as a cyclone where it is separated from the transfer air and permitted to fall into another processing system that performs the solidification process.

In other applications where cooling and/or accurate metering is less important, an alternate embodiment of this invention may be used to control the movement of powdered or granular materials across a boundary.

It is an object of this invention to provide a new and improved system for transporting radioactive powders or granular materials.

It is another object of this invention to control the flow of metered amounts of powdered or granular materials across a boundary that exists between an upper volume and a lower volume.

Further objects and advantages of this invention will become more apparent as the following description proceeds, which invention should be considered together with the accompanying drawings.

BRIEF DESCRIPTION OF THE DRAWINGS

FIG. 1 is a schematic diagram showing the apparatus of this ivention applied in a system for the safe cooling, isolation, storage, transfer, and solidification of dry, powdered radioactive waste.

FIG. 2 is a sectional diagram showng the isolation hopper transfer valve in detail.

FIG. 3 is a sectional diagram depicting an alternate embodiment of the invention shown in FIG. 2.

DESCRIPTION OF A PREFERRED EMBODIMENT

Referring now to the drawings in detail, and more particularly to FIG. 1, the reference character 11 represents a volume reduction system (incinerator) or fluid bed dryer that produces radioactive ash and/or radioactive calcined salts. The aforementioned ash and calcined salts are transferred to a cyclone separator 13 via pipe 12. Separator 13 separates the solid ash and calcined salt particles from the transfer air. The above mentioned solid particles drop into isolation hopper 16 via down comer 15. Isolation hopper 16 comprises a surge hopper 17; a valve 18; a cooling eductor hopper 19; and a remote blower 20. In essence, hopper 16 isolates the volume reduction system, i.e., incinerator 11 and cyclone 13 from storage hopper 21. Surge hopper 17 isused as a dynamic storage area (the incoming ash and salts move downward within hopper 17 as ash and salts are fed out of the bottom of cooling eductor hopper 19). The transit time of the radioactive ash and radioactive calcined salts in hopper 17 is approximately 4 to 5 hours. In some applications the ash and calcined salts are not allowed to totally cool within hopper 17 because the ash and salts may absorb moisture contained in the air used to transfer them to cyclone separator 13 thus reducing their free flow character and causing them to consolidate and bridge across the discharge of surge hopper 17. Sensors 14 are arranged within hopper 17 to insure that the average rate of transfer from the lower portion of this system automatically matches the average transfer rate into hopper 17. Valve 18 transfers from hopper 17 to cooling eductor 19 metered quantities of ash and salt. Eductor 19 fluidizes its ash and salt contents with the cool air produced by blower 20 to reduce the temperature of the ash and salt prior to transferring the ash and salts to storage hopper 21.

Near the bottom of storage hopper 21 is a weir 22. Weir 22 consists of a number of sections that are independent of one another. Thus, each section of the aforementioned weir may be vibrated and/or pivoted independently of the other sections to inject oscillatory forces at a point or points on weir 22. Air is blown (at aproximately 130 CFM) from blower 20 through channel 29 located directly below weir 22. The radioactive material will then be fed over weir 22 and be picked up by the air stream created by blower 20 and transferred to gas solid separator 25 via transfer line 24.

Separator 25 separates solid ash and salt particles from the transfer air mixed with these particles and permits the solid particles to fall to drumming station 27 via pipe 26. Drumming station 27 contains a drum 28 wherein the received cooled ash and salt particles are mixed with a solidification agent, so that when drum 28 is full it may be removed from station 27 and safely stored.

When this system is used for purposes of temperature and pressure isolation between static storage 21 and volume reduction system 11, the same air that is used to transfer salt and ash is also used to transfer the moisture of evaporation and incineration. Hence, special considerations are required to avoid condensation from occurring in the surge hopper 17 portion of the isolated hopper 16. Condensation on the wall of the hopper 17 would coagulate the salt or ash and rapidly act to block flow. In a typical application the dew point of the volume reduction system transfer air is above 160° F. Since the isolation hopper 16 is at ambient temperature, i.e., between 70° and 90° F., when it is first started, the aforementioned problem is avoided by preheating hopper 17 by energizing several heaters 23 which are connected to the outside walls of surge hopper 17. When the volume reduction system is started, heater 23 will be energized causing the temperature in hopper 17 to rise to approximately 180° F. Once the temperature in hopper 17 reaches 180° F., hetaer 23 will be de-energized. Hence, when the hot air and radioactive ash and salts are injected into hopper 17, they will no longer coagulate since the conditions within the hopper 17 that could permit condensation will be removed by heaters 23.

Hence, cooling essentially occurs in isolation hopper 16 which comprises surge hopper 17, valve 18, and cooling eduction hopper 19 together with assorted instrumentation (not shown).

FIG. 2 shows valve 18 and cooler eductor 19 in greater detail. The upper end of valve 18 has a flange 30 which is connected to the lower flanged end of hopper 17 by means of bolts 31. Valve 18 has an inner throat 32, an outer cylinder 33, and a valve housing 44. Throat 32 has a flanged surface 40 and cylinder 33 has flanged surfaces 41 and 42. Cylinder 33 has taps 57 connected through its wall to its outside surface. Pressure sensor instrumentation (not shown) is connected to taps 57. Flanges 40 and 41 are connected to each other by bolts (not shown). Valve throat 32 has the same inside diameter as hopper 17 and is on the same center line as hopper 17 so that in effect throat 32 is an inner extension of hopper 17. Between throat 32 and outer cylinder 33 is a moveable piston or cylinder 34 which has a lower end that forms a chamber 55. A step 56 is connected to the inner wall of piston 34. A space 53 exists between piston 34 and throat 32. Between piston 34 and cylinder 33 is a gap 50. The upper end of gap 50 is coupled to port A and the lower end of gap 50 is coupled to port B. Clean, dry instrument air, or compressed air may be applied to gap 50 via ports A or B. Pressure seals or piston rings 51 and 52 are used to seal gap 50. When air is introduced into gap 50 from port A, pressure seal 51 will prevent air from flowing down past seal 51 and when air is introduced into gap 50 from port B pressure seal 51 will prevent air from flowing upward past seal 51, and seal 52 will prevent air from flowing downward past seal 52. Block 43 fits between outer cylinder 33 and housing 44. Block 43, cylinder 33, and housing 44 are fastened to each other by bolts (not shown). Cooler eductor 19 is bolted to valve housing 44. A cylinder 60 having a top plate or platform 61 is positioned within valve housing 44 so that plate 61 will have the same diameter as the minor diameter of chamber 55. A by-pass or poppet valve 62 is connected to cylinder 60. An eductor cone discharge 65 is fixed within the lower end of cooling eductor 19. Eductor 65 is connected to a pipe 66. Cooling air exhaust pipe 67 points upward and pipe 67 is connected to a valve 76. Pipe 66 is connected to a valve 68. Valves 68 and 76 are coupled together and to storage hopper 21 (not shown). An air disperser 70 and cooling and transfer air inlet nozzle 72 are coupled to the lower end of cooler eductor 19. The bottom of piston 34 namely chamber 55 will move from point X to point Y when 60 pounds of air pressure is introduced to gap 50 via port A. Chamber 55 will move from point Y to point X when air pressure is applied via port B and gap 50. When chamber 55 is at point X the radioactive salts and ash particles will flow from hopper 17 through inner throat 32 to chamber 55 adjacent to platform 61. Platform 61 supplies support to the radioactive material that is sitting above it and it also is a vehicle in which a by-pass or poppet valve 62 can be introduced so that if the normal mode of radioactive material transfer has failed, i.e., seals 51 and 52 have failed and/or chamber 55 is jammed in a certain position, the radioactive material may be removed via valve 62. Valve 62 may be manually activated by introducing air at port C. When air is introduced at port C, the piston contained within valve 62 will be pushed up causing valve 62 to open and the radioactive material contained within chamber 55 and supported on platform 61 will flow into cooler eductor 19. Fluidizers 75 are connected to platform 61. A high velocity air stream (not shown) may be injected into fluidizers 75 so that the radioactive material will be deconsolidated and made to flow like a fluid into eductor 19. Chamber 55 will receive radioactive material when it is at point X and chamber 55 will act like a cylindrical gate as it engages platform 61 and cuts the flow of radioactive material into cooler eductor 19. When air is injected into port A, chamber 55 will move to point Y and step 56 will engage platform 61 to prevent material other than that contained within chamber 55 from entering the lower portion of valve housing 44 and cooler eductor 19. Thus, a controlled amount of radioactive material will be transferred during a specified period of time. The radioactive material contained within chamber 55 will flow beyond the cylindrical wall of platform 61 into the lower portion of valve housing 44. The aforementioned divergent flow of radioactive material will prevent the radioactive material from bridging, and under unusual conditions call still be caused to flow out of hopper 17 to cooler eductor 19 by means of poppet valve 62 and fluidizer 75. Because platform 61 is stationary and it is not required to move vertically in order to control the flow of material, excessive consolidation of the radioactive material is avoided.

Point is a nominal position for chamber 55 and piston 34. In this position step 56 and the column of ash and salt above platform 61 provide the best seal against the flow of hot, moist air from the volume reduction system 11 to the static storage hopper 21. During the time that piston 34 and chamber 55 are at position Y, the radioactive material is cooled by circulating air in the cooler eductor 19. Sufficient air velocity is available within cooler eductor 19 to assure that all material is removed from chamber 55 at the end of the transfer stroke, point Y. Cooling air introduced through a conduit 72, and air disperser 70 is exhausted from cooler eductor 19 by way of pipe 67 that is designed to be inefficient as a dust collector and, therefore, only small amounts of very fine powdered radioactive material will be transferred out of the cooler eductor 19 when valve 76 is open.

In summary, the flow path of a radioactive particle through FIG. 2 would be as follows: it would slowly progress straight through hopper 17, valve throat 32 and it would tend to move divergently towards chamber 55. The radioactive particle would eventually move into chamber 55 and be transferred from there to the lower end of housing 44 when chamber 55 is moved from point X to point Y. The aforementioned radioactive particle will flow into cooler eductor 19 where it will reside for approximately 6 to 7 minutes so that it may be cooled before it is transferred along with a metered quantity of material, through eductor 65 pipe 66 and valve 68 to storage hopper 21 (shown in FIG. 1).

Figure 2:
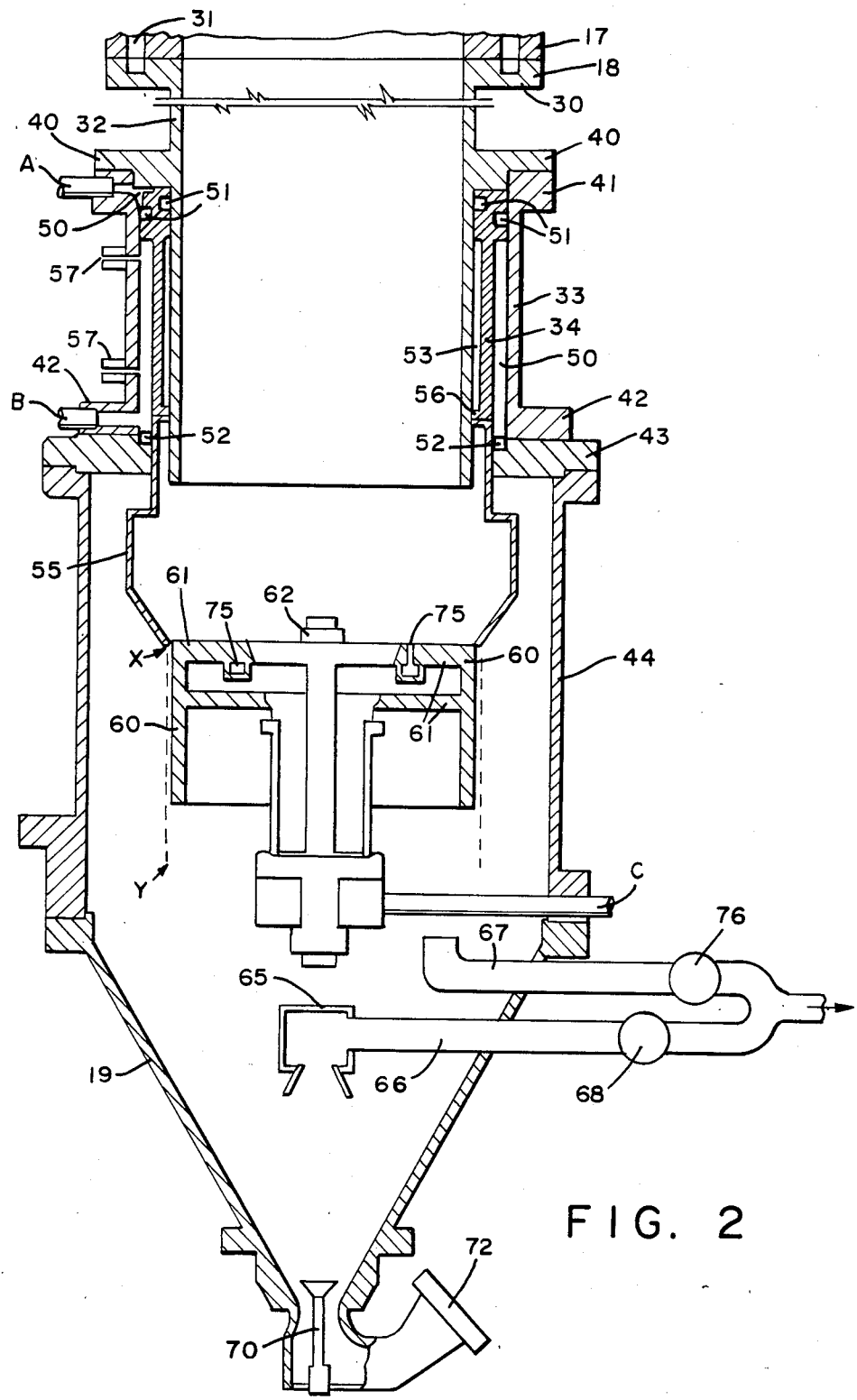
Figure 3:
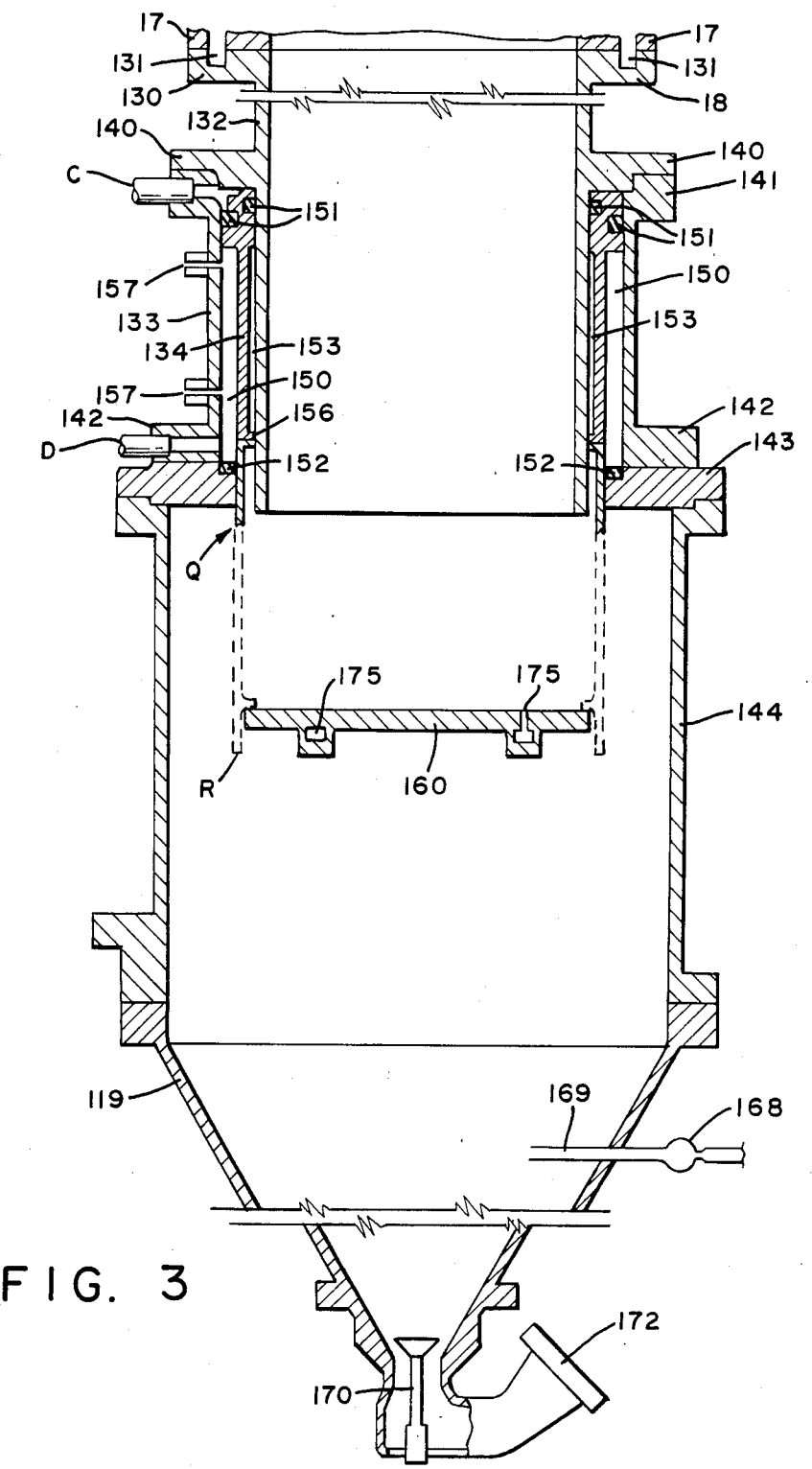

FIG. 3 is an alternate embodiment of the invention described in FIG. 2 with a slightly different design for valve 18 and cooler eductor 19. This embodiment may be used for metering and transporting dry materials, i.e., cement, flour, ash, pharmaceuticals, etc., which under some conditions tend to rapidly fluidize but if the same materials are permitted to stand they would consolidate sufficiently to bridge across discharge openings. The upper end of valve 18 has a flange 130 which is connected to the lower flanged end of hopper 17 by means of bolt 131. Valve 18 has an inner throat 132, an outer cylinder 133, and a valve housing 144. Throat 132 has a flanged surface 140 and cylinder 133 has flanged surfaces 141 and 142. Cylinder 133 has taps 157 connected through its wall to its outside surface so that pressure sensor instrumentation (not shown) may be connected to taps 157. Flanges 140 and 141 are connected to each other by bolts (not shown). Valve throat 132 has the same inside diameter as hopper 17 and is on the same center line as hopper 17 so that in effect throat 132 is an inner extension of hopper 17. Between throat 132 and cylinder 133 is a moveable piston or cylinder 134 which has a step 156 connected to the inner wall of piston 134. A space 153 exists between piston 134 and throat 132. Between piston 134 and outer cylinder 133 is a gap 150. The upper end of gap 150 is coupled to port C and the lower end of gap 150 is coupled to port D. Clean, dry instrument air, or compressed air may be applied to gap 150 via ports C or D. Pressure seals or piston rings 151 and 152 are used to seal gap 150. When air is introduced into gap 150 from port pressure seal 151 will prevent air from flowing down past seal 151 and when air is introduced into gap 150 from port D, pressure seal 151 will prevent air from flowing upward past seal 151, and seal 152 will prevent air from flowing downward past seal 152. Block 143 fits between cylinder 133 and housing 144. Block 143, cylinder 13, and housing 144 are fastened to each other by bolts (not shown) hopper 119 is bolted to valve housing 144. The bottom of piston 134 will move from point Q to point R when 60 pounds of air pressure is introduced to port C. The lower end of piston 134 will move from point R to point Q when 60 pounds of air pressure is introduced to port D. When the lower end of piston 134 is at point Q, the materials will flow from hopper 17 through inner throat 132 passed platform 160 into hopper 119. Platform 160 is a closure which, together with piston 134, forms a cylindrical gate. Fluidizers 175 are connected to platform 160. A high velocity air stream may be injected into fluidizers 175 (the air stream is not shown) so that the material will be de-consolidated and be able to flow like a fluid into hopper 119 when piston 134 moves to point Q. Piston 134 will allow free flow of material when it is at point Q and will act like a cylindrical gate as it engages platform 160 and cuts the flow of material into hopper 119. When air is introduced to port C, piston 134 will move to point R and step 156 will engage platform 160 to prevent material from entering the lower portion of valve housing 144. Thus, a certain amount of material will be transferred during a specified time period. The material contained within piston 134 will flow in a divergent fashion around platform 160 into the lower portion of valve housing 144. The aforementioned divergent flow of material will prevent the material from bridging. When hopper 119 is full, or nearly so, air is introduced to port C causing piston 134 to move to point R within a couple of seconds. Hopper 119 is coupled to valve throat 144. At the lower end of hopper 119 is a conduit 172 thrugh which transfer air may be introduced. This transfer air is dispersed through hopper 119 by air disperser 170. When there is a sufficient amount of material within hopper 119, and the operator of this invention wants the material to be transferred, valve 168 is opened and air is passed through conduit 172 causing the material within hopper 119 to be vacuumed or picked up by pipe 169 and transferred through valve 168 to the place where the operator wants the material to be stored and packaged. Taps 157 are used to determine the position of piston 134, i.e., is piston 134 at point Q or point R. The foregoing is accomplished by connecting taps 157 to pressure sensitive instrumentation (not shown) and have the above referenced instrumentation determine the differential pressure contained within gap 150 and ports C and D and thus the location of piston 134. The above has described a system in which a certain volume of material is permitted to flow across the boundary defined by the platform 160 and piston 134.

The above specification describes a new and improved metering and transporting system for moving certain amounts of powdered or granular materials across a boundary. It is realized that the above description may indicate to those skilled in the art additional ways in which the principles of this invention may be used without departing from its spirit. It is, therefore, intended that this invention be limited only by the scope of the appended claims.

What is claimed is:

1. A vertically positioned dust-tight transfer system for controlling and initiating the flow of recently incinerated radioactive materials and/or dried radioactive materials, from a separator that separates the solid radioactive materials form gases that may be mixed with the solid radioactive materials, to a drumming station, said system comprising:
   (a) means for temporarily storing the solid radioactive materials;
   (b) means defining a first chamber connected to said temporary storing means, said first chamber having a first opening that receives materials from said storing means and a second opening for the exiting of the materials;
   (c) a hollow vertically translatable member defining a second chamber having a first upper end which receives said materials from the second opening of said first chamber and a second lower end;
   (d) a stationary platform located at the second end of said second chamber, said platform, extending radially inward of said member, said platform having a surface which provides for the radial outward flow of the solid radioactive material in the direction of said hollow member;
   (e) said hollow vertically translatable member further having a lower extension means that holds in isolation metered amounts of said radioactive material when the second end of said hollow member is in contact with said platform,
   (f) means for vertically translating said hollow member to bring said lower extension into and out of contact with said platform to transfer a metered quantity of said material;
   (g) means defining a third chamber located below said platform and below said second chamber, said third chamber receiving the metered quantity of said radioactive material when the lower extension of said member moves out of contact with said platform;
   (h) cooling means located in said third chamber for cooling the radioactive material in said third chamber; and
   (i) transferring means operatively connected to said third chamber for transporting the radioactive material contained within said third chamber to a drumming station.

2. The system claimed in claim 1 wherein said temporary storing means is a surge hopper.

3. The system claimed in claim 1 wherein said hollow translatable member is a hollow piston.

4. The system in claim 1 wherein at least one fluidization means which ejects a high velocity air stream into said second chamber is connected to said platform to improve the flow characteristics of the radioactive materials.

5. The system claimed in claim 1 wherein said cooling means comprises:
   a first conduit that receives cool air;
   an air disperser which disperses within said third chamber the cool air received by said conduit;
   a second conduit within said third chamber that discharges heated air; and
   a third conduit within said third chamber that discharges heated air and radioactive powder.

6. The system claimed in claim 1 wherein said transferring means is a eductor.

7. The system claimed in claim 1 further including means for heating the inside of said temporary storing means to eliminate condensation when said transfer system is started, said heating means is operatively connected to said temporary storing means.

8. The system claimed in claim 7 wherein said heating means is at least one heater.

9. The system claimed in claim 7 wherein said heating means includes at least one thermocouple.

10. The system claimed in claim 1 further including means connected to said platform for removing the radioactive material sitting on said surface of said platform when said system fails.

11. The system claimed in claim 10 wherein said removing means is a bypass valve.

12. The system claiemd in claim 10 wherein said removing means is a poppet valve.

13. The system claimed in claim 1 wherein said third chamber is a cooler eductor.

14. The system claimed in claim 13 wherein said cooler eductor is conically shaped.

15. The system claimed in claim 1 wherein said means for vertically translating said vertically translatable member includes means defining a gap between said member and said first chamber, and means for injecting air into said gap to vertically translate said member in a direction toward and away from said platform to move said lower extension into and out of contact therewith.

16. The system claimed in claim 15 wherein said gap is operatively connected to a first air port which is located on said second chamber near the first end of said member, and a second airport which is located on said second chamber near the second end of said member, whereby said member moves upward by injecting air in said second air port and said member moves downward by injecting air in said first air port.

17. The system claimed in claim 16 further including taps and pressure sensitive instrumentation which are operatively connected to said first and second air ports to determine the differential pressure that exists between said taps and said air ports and hence the location of said member.

* * * * *